US008001386B2

(12) United States Patent
Goodman et al.

(10) Patent No.: US 8,001,386 B2
(45) Date of Patent: *Aug. 16, 2011

(54) COOPERATIVE NON-REPUDIATED MESSAGE EXCHANGE IN A NETWORK ENVIRONMENT

(75) Inventors: Brian D. Goodman, Norwalk, CT (US); Frank L. Jania, Chapel Hill, NC (US); James K. Kebinger, Somerville, MA (US); Darren M. Shaw, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 666 days.

This patent is subject to a terminal disclaimer.

(21) Appl. No.: 12/054,970

(22) Filed: Mar. 25, 2008

(65) Prior Publication Data

US 2008/0172561 A1     Jul. 17, 2008

Related U.S. Application Data

(63) Continuation of application No. 11/303,430, filed on Dec. 16, 2005, now Pat. No. 7,568,106.

(51) Int. Cl.
*H04L 9/00* (2006.01)
(52) U.S. Cl. .......................... 713/180; 713/176; 713/170
(58) Field of Classification Search .................... None
See application file for complete search history.

(56) References Cited

U.S. PATENT DOCUMENTS

| 5,003,593 | A | 3/1991 | Mihm, Jr. |
| 5,748,736 | A | 5/1998 | Mittra |
| 6,237,096 | B1 | 5/2001 | Bisbee et al. |
| 6,336,105 | B1 | 1/2002 | Conklin et al. |
| 6,745,327 | B1 | 6/2004 | Messing |
| 6,898,707 | B1 | 5/2005 | Sit et al. |
| 6,904,521 | B1 | 6/2005 | Jivosov |
| 2002/0026321 | A1 | 2/2002 | Faris et al. |
| 2002/0169953 | A1 | 11/2002 | Moharram et al. |
| 2002/0188650 | A1 | 12/2002 | Sun et al. |
| 2002/0188653 | A1 | 12/2002 | Sun |
| 2003/0040869 | A1 | 2/2003 | Nir et al. |
| 2003/0065956 | A1 | 4/2003 | Belapurkar et al. |
| 2003/0105815 | A1 | 6/2003 | Gusler et al. |
| 2003/0105822 | A1 | 6/2003 | Gusler et al. |

(Continued)

OTHER PUBLICATIONS

Howard, John H "Using reconciliation to share files between occasionally connected computers," IEEE, Proceedings of the Fourth Workshop on Workstation Operating Systems, 1993, pp. 56-60.*

(Continued)

*Primary Examiner* — Jung Kim
(74) *Attorney, Agent, or Firm* — Gibb I.P. Law Firm, LLC

(57) ABSTRACT

A system and method of performing cooperative non-repudiated message exchange from a first system to a second system in a computer network comprises checking for discrepancies between a current system time in the second system with an actual time; performing a time synchronization process to match the current system time with the actual time; exchanging public encryption keys between the first and second systems; sending a digitally signed message from the first system to the second system; decoding the digitally signed message; sending a digitally signed acknowledgment message from the second system to the first system; decoding the digitally signed acknowledgment message; and committing text of the digitally signed message to an official transcript on the first system.

18 Claims, 8 Drawing Sheets

U.S. PATENT DOCUMENTS

| | | | |
|---|---|---|---|
| 2003/0204720 | A1 | 10/2003 | Schoen et al. |
| 2003/0204741 | A1 | 10/2003 | Schoen et al. |
| 2004/0073513 | A1 | 4/2004 | Stefik et al. |
| 2004/0078567 | A1 | 4/2004 | Newbould |
| 2004/0133520 | A1 | 7/2004 | Callas et al. |
| 2004/0163091 | A1 | 8/2004 | Brill |

OTHER PUBLICATIONS

Zhou et al. "A Fair Non-repudiation Protocol," IEEE, Proceedings of the 1996 IEEE Symposium on Security and Privacy, 1996, pp. 55-61.*

Kremer et al. "An Intensive Survey of Non-Repudiation Protocols," Computer Communications, vol. 25, 2002.*

Conrad, Michael "Non-repudiation mechanisms for Peer-to-Peer networks," ACM, Proceedings fo the 2006 ACM CoNEXT conference, 2006.*

European Patent Office Communication Dated Sep. 29, 2009, pp. 1-3.

"Discover OPN System Server," Antepo, Inc., 2000-2004, 2 pages.

"Discover OPN System Server," OPN System 4.5 New Features, Computerworld, Antepo, Inc., 2000-2004, 1 page.

"Secured Instant Messaing," Digilox Secure Instant Messaging (SIM), 2004, 1 pages.

"Live Communications Server 2005 Security Guide," Microsoft Office Live Communications Server 2005, Nov. 2004, 64 pages.

"TCS' FileSigner™ Plus", TATA Consultancy Services Limited, 4 pages.

"[SafeGuard® Transaction Client]", The Secure Way for Digitally Signing you Web-Based Transactions, Utimaco Safeware, 4 pages.

* cited by examiner

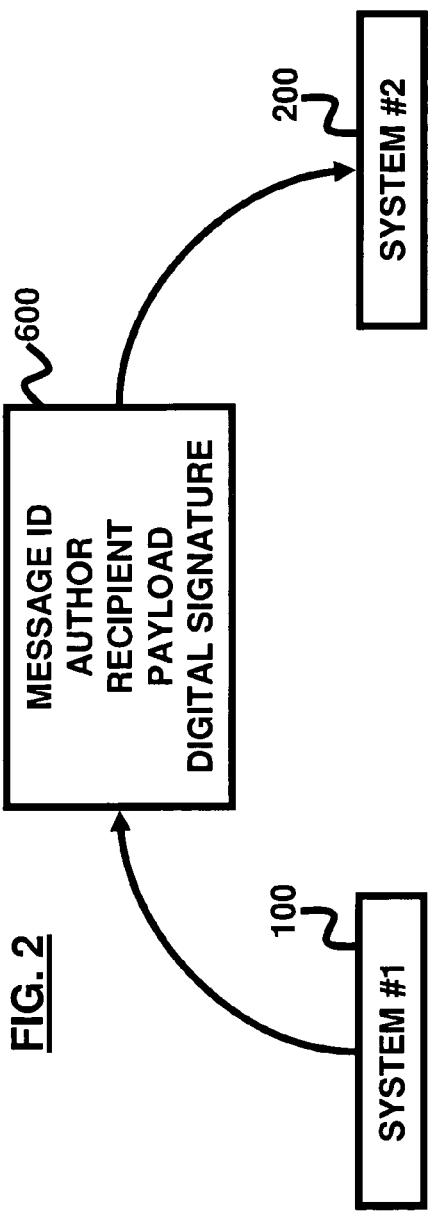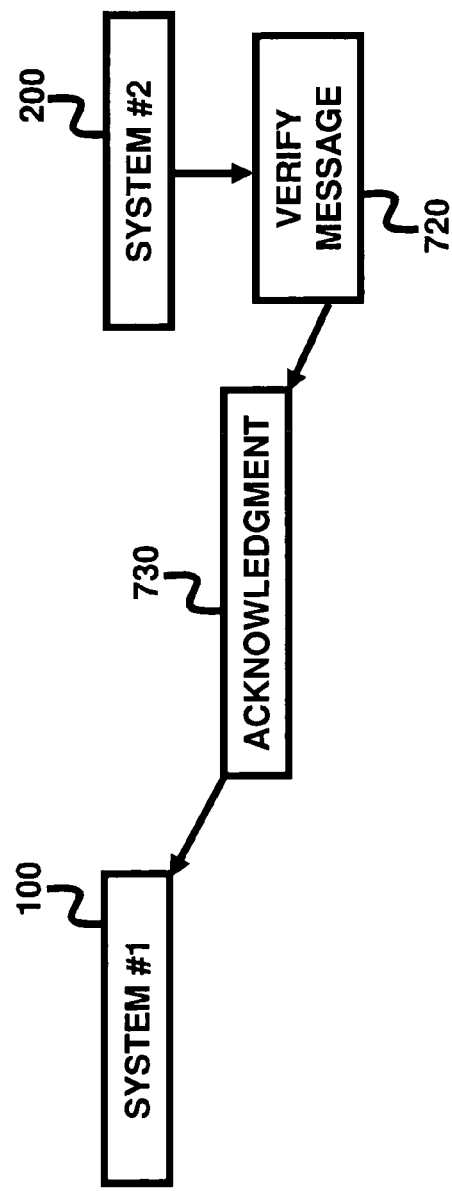

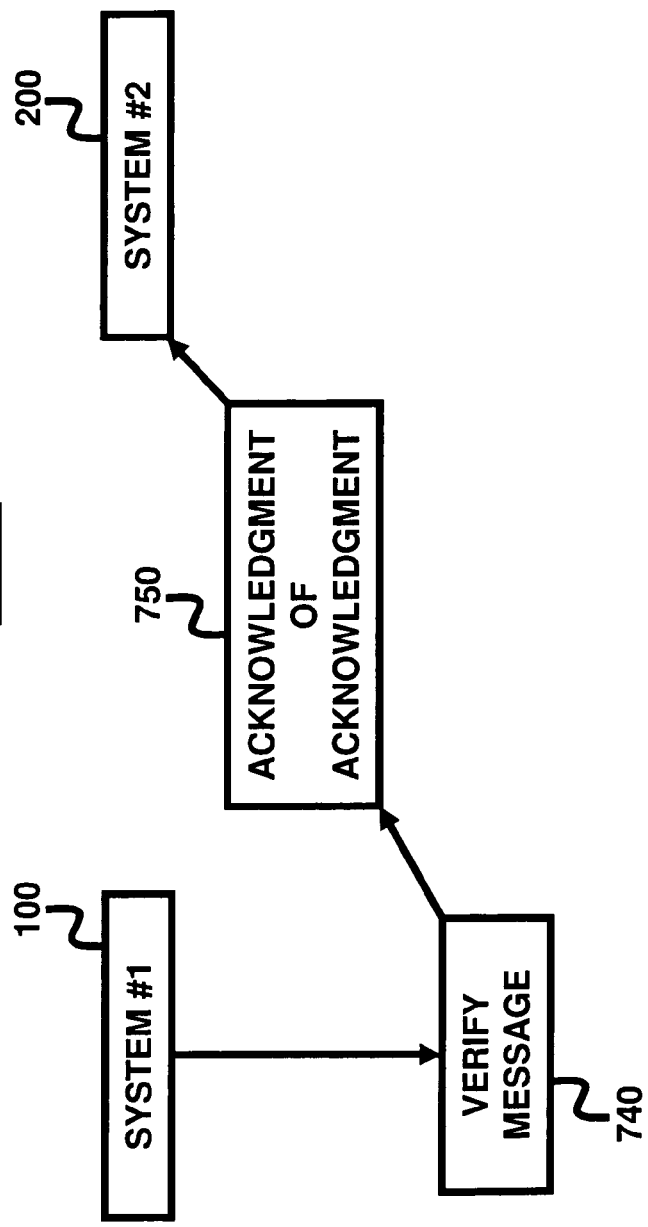

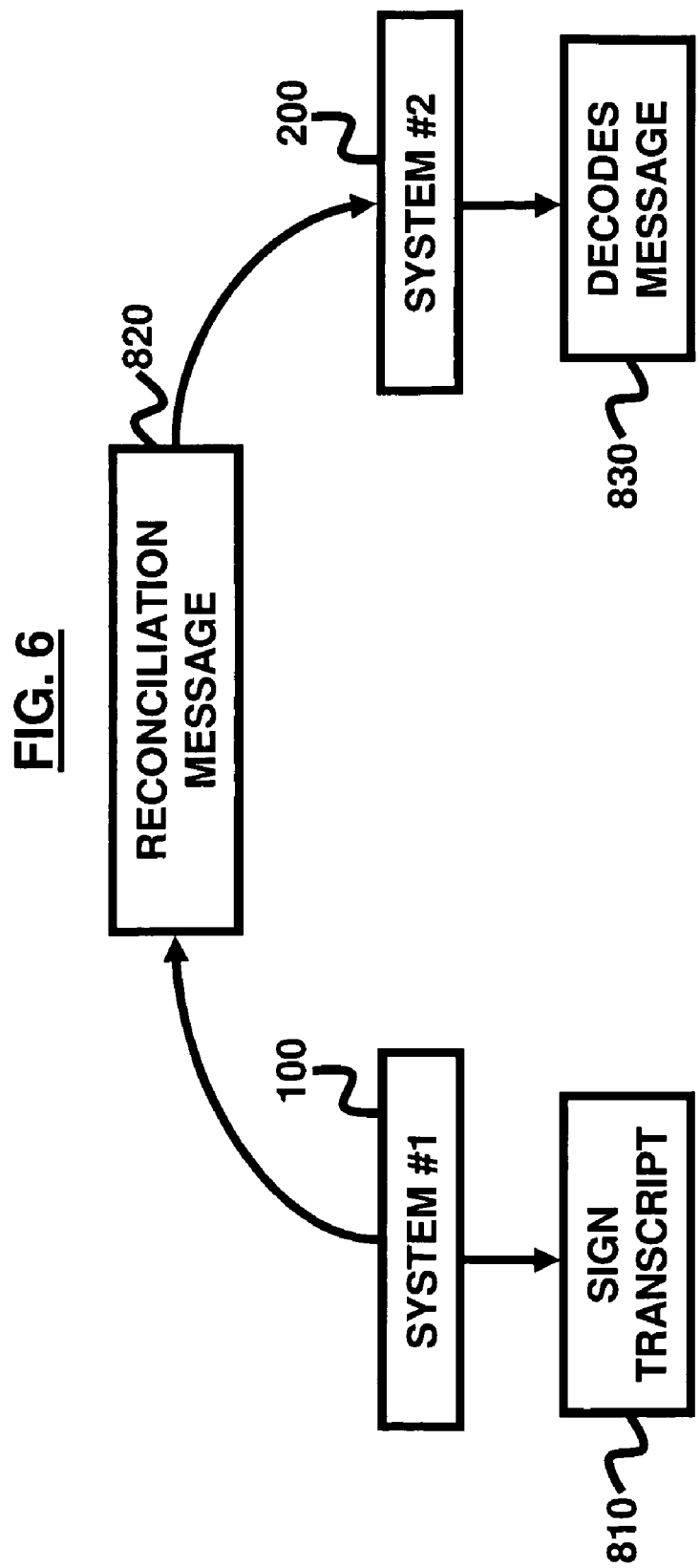

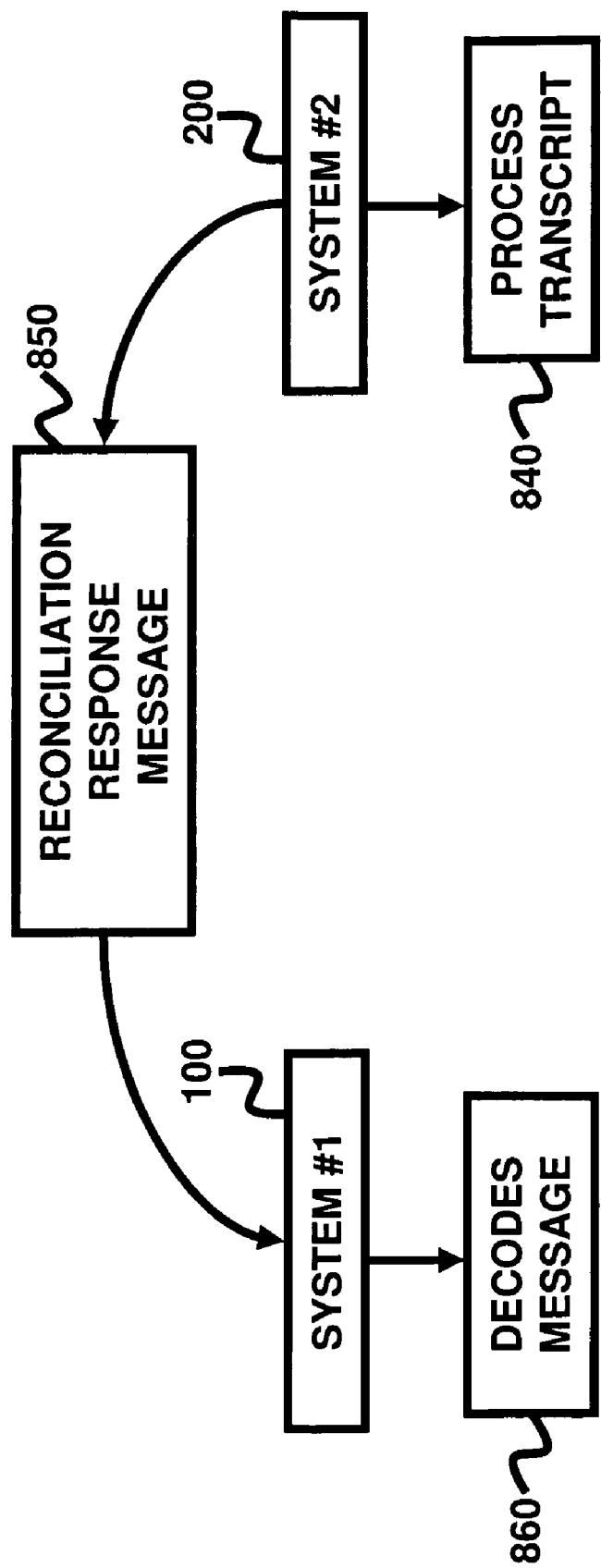

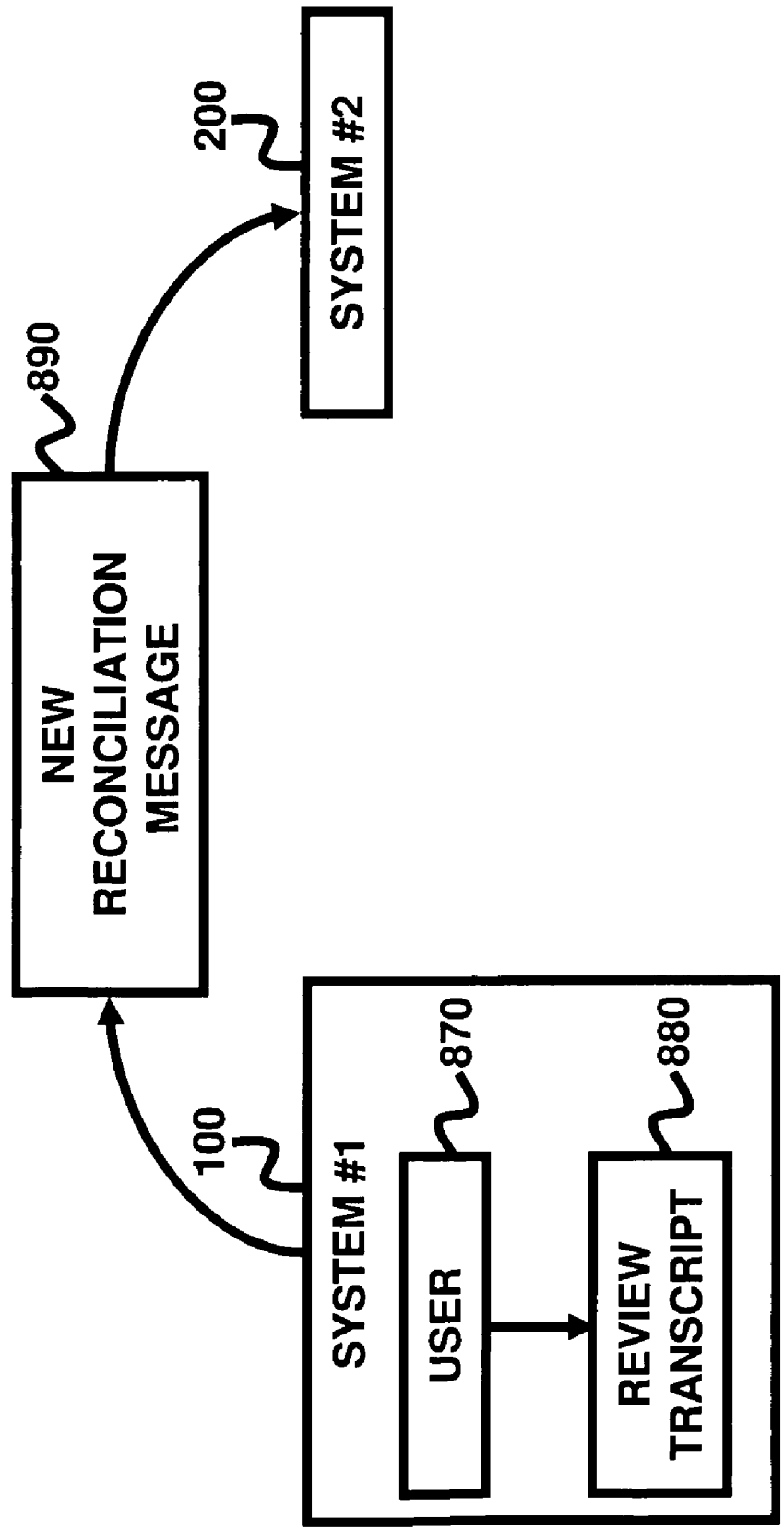

COOPERATIVE NON-REPUDIATED MESSAGE EXCHANGE IN A NETWORK ENVIRONMENT

CROSS-REFERENCE TO RELATED APPLICATIONS

This application is a Continuation of U.S. application Ser. No. 11/303,430 filed Dec. 16, 2005 now U.S. Pat. No. 7,568,106, the complete disclosure of which, in its entirety, is herein incorporated by reference.

BACKGROUND

1. Technical Field

The embodiments herein generally relate to network computing, and, more particularly, to peer-to-peer instant messaging systems.

2. Description of the Related Art

Conventional peer-to-peer instant messaging systems and methods provide means for encrypting, signing, and partial non-repudiation. Specifically, encryption ensures that the communication between n number of systems is private allowing only the intended recipients access. Digital signing offers both identifiable marking as well as data integrity, whereby a first system can sign a data set and a second system can verify that the data is the same as when it was signed and what entity signed the data. Non-repudiation occurs when, at a given point in time, a given data set and its origin are known. A system supporting non-repudiation can prove that a given data set has originated from user A on system A and that the data is unchanged.

The conventional techniques support a variety of means for securing information and, in part, non-repudiation. Non-repudiation occurs when all participants agree that something is true. For example, when one attempts to buy a house, several people involved in the transaction present documents, and signatures are exchanged and witnesses notarize the event. Accordingly, the resulting set of documents cannot be legally repudiated. This is critical for there to be legally binding documents. In the digital realm, one may see similar activity ensuring that the intended recipient only receives messages from a particular source, but often the conventional systems fail to ensure that a particular message in its propagation is maintained in tact from origination to receipt.

As an analogy, a bank cannot change the interest rate on the contract once everyone has signed and agreed to the terms of a mortgage contract. However, a first person may be able to take an email that was sent (encrypted and signed) by a second person and modify the message before the first person forwards it to a third person (or back to the second person). While, there is a general trust that the first person would represent the message as it was originally presented by the second person and not amend it. However, the digital world makes it exceedingly easy for one to alter digital content. In the collaboration space, and specifically, instant messaging, there are systems that attempt to provide non-repudiation, but these systems tend to rely on trust. Specifically, in the case of instant messaging, the ability to ensure both clients save the exact same transcript (i.e., digital document) generally does not exist. Accordingly, there remains a need for improvements to non-repudiation message exchange in network computing.

SUMMARY

In view of the foregoing, the embodiments herein provide a method of performing cooperative non-repudiated message exchange from a first system to a second system in a computer network, and a program storage device readable by computer, tangibly embodying a program of instructions executable by the computer to perform a method of performing cooperative non-repudiated message exchange from a first system to a second system in a computer network, wherein the method comprises checking for discrepancies between a current system time in the second system with an actual time; performing a time synchronization process to match the current system time with the actual time; exchanging public encryption keys between the first and second systems; sending a digitally signed message from the first system to the second system; decoding the digitally signed message; sending a digitally signed acknowledgment message from the second system to the first system; decoding the digitally signed acknowledgment message; and committing text of the digitally signed message to an official transcript on the first system.

The method may further comprise transmitting a reconciliation message between the first and second systems; decoding the reconciliation message, wherein the reconciliation message comprises a payload comprising a transcript; determining an accuracy of the transcript by creating transcript deltas between identified text in the transcript and actual text in the transcript; sending a digitally signed reconciliation response message; decoding the digitally signed reconciliation response message; reviewing the transcript; and determining whether to accept the transcript. The time synchronization process may comprise verifying, by the second system, the current system time of the second system; determining whether an official time check of the second system is required; connecting to a list of known timeservers to resynchronize the current system time of the second system; validating the current system time of the second system with the timeservers; determining whether the current system time matches a pre-specified threshold; and determining whether to accept the current system time as the actual time.

Preferably, the decoding of the digitally signed message comprises verifying a digital signature of the digitally signed message; and verifying a digital integrity of the digitally signed message. Preferably, the decoding of the digitally signed acknowledgment message comprises verifying a digital signature of the digitally signed acknowledgment message; verifying a digital integrity of the digitally signed acknowledgment message; identifying a message identifier and a digital signature in the digitally signed acknowledgment message; and verifying that the digital signature matches a digital signature generated for the message identifier. Preferably, the decoding of the reconciliation message comprises verifying a digital signature of the reconciliation message; and verifying an integrity of the reconciliation message.

Another embodiment provides a system and method of performing cooperative non-repudiated message exchange from a first system to a second system in a computer network, and a program storage device readable by computer, tangibly embodying a program of instructions executable by the computer to perform a method of performing cooperative non-repudiated message exchange from a first system to a second system in a computer network, wherein the method comprises sending a digitally signed message from the first system to the second system; decoding the digitally signed message; sending a digitally signed acknowledgment message from the second system to the first system, wherein the digitally signed acknowledgment message acknowledges receipt of the digitally signed message and verifies a correctness of the digitally signed message by the second system; decoding the digitally signed acknowledgment message; and committing text of the digitally signed message to an official transcript on the first system.

Another embodiment provides a system of performing cooperative non-repudiated message exchange in a computer network, wherein the system comprises a first system adapted to check for discrepancies between a current system time in the second system with an actual time and perform a time synchronization process to match the current system time with the actual time; data public encryption keys exchanged between the first and second systems; a digitally signed message transmitted from the first system to the second system; a first decoder operatively connected to the second system and adapted to decode the digitally signed message; a digitally signed acknowledgment message transmitted from the second system to the first system; a second decoder operatively connected to the first system and adapted to decode the digitally signed acknowledgment message; and an official transcript on the first system comprising text of the digitally signed message.

The system may further comprise a reconciliation message transmitted between the first and second systems; a third decoder operatively connected to the second system and adapted to decode the reconciliation message, wherein the reconciliation message comprises a payload comprising a transcript; a processor operatively connected to the second system and adapted to determine an accuracy of the transcript by creating transcript deltas between identified text in the transcript and actual text in the transcript; a digitally signed reconciliation response message; and a fourth decoder operatively connected to the first system and adapted to decode the digitally signed reconciliation response message, wherein the first system is adapted to review the transcript and determine whether to accept the transcript.

Preferably, the second system is adapted to verify the current system time of the second system, wherein the first system is adapted to determine whether an official time check of the second system is required, and wherein the system further comprises a list of known timeservers operatively connected to the first system and adapted to resynchronize the current system time of the second system. Preferably, the timeservers are adapted to validate the current system time of the second system, wherein the first system is adapted to determine whether the current system time matches a pre-specified threshold and determine whether to accept the current system time as the actual time.

The first decoder is preferably adapted to verify a digital signature of the digitally signed message; and verify a digital integrity of the digitally signed message. Additionally, the second decoder is preferably adapted to verify a digital signature of the digitally signed acknowledgment message; verify a digital integrity of the digitally signed acknowledgment message; identify a message identifier and a digital signature in the digitally signed acknowledgment message; and verify that the digital signature matches a digital signature generated for the message identifier. Furthermore, the fourth decoder is preferably adapted to verify a digital signature of the reconciliation message; and verify an integrity of the reconciliation message.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 1 through 8 illustrate schematic diagrams of a system implementation of a process according to an embodiment herein;

DETAILED DESCRIPTION OF PREFERRED EMBODIMENTS

Figure 1:
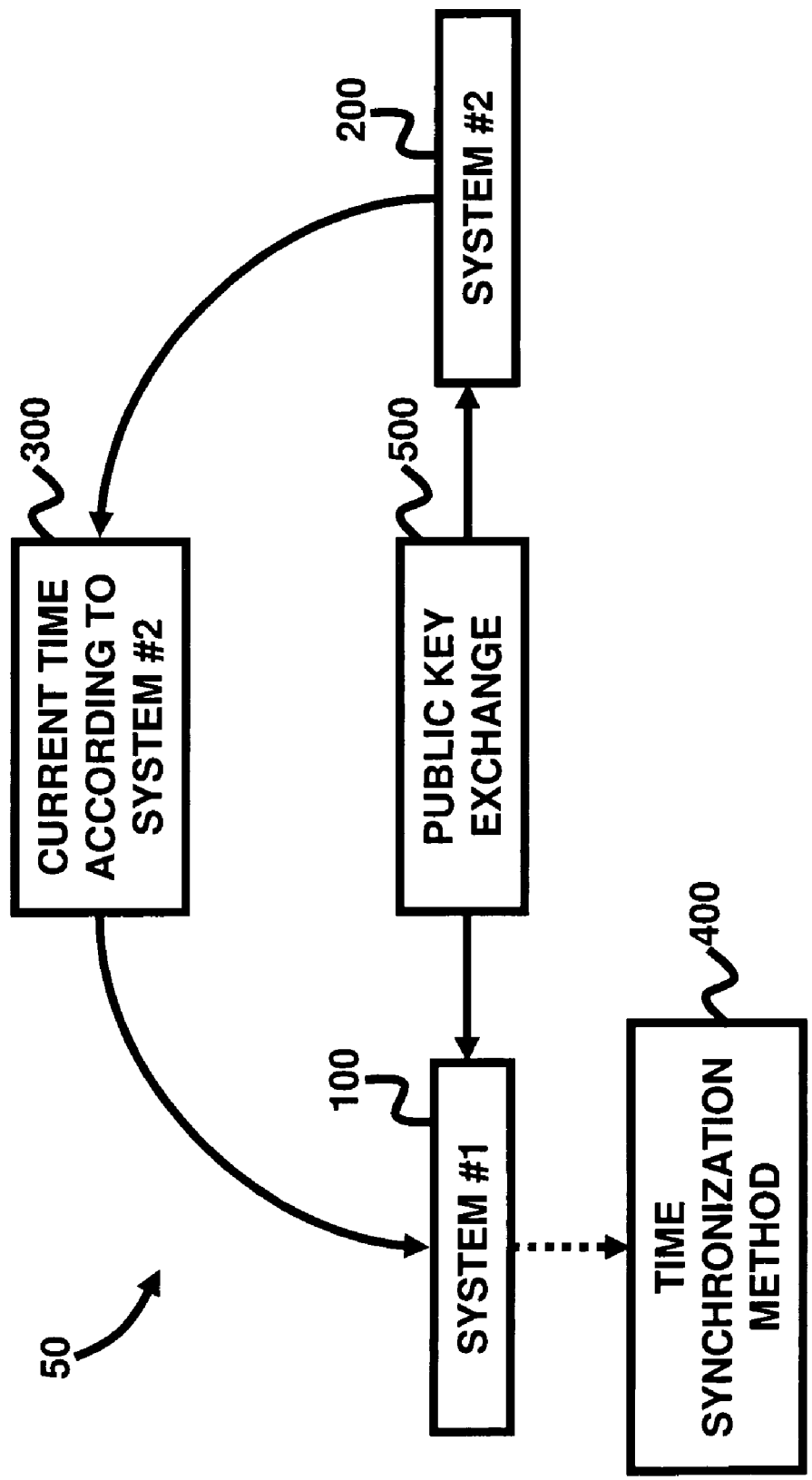

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As previously mentioned, there remains a need for improvements to non-repudiation message exchange in network computing. The embodiments of the herein achieve this by providing a technique for ensuring a non-repudiated outcome in network-based collaboration, and specifically, in instant messaging systems. Specifically, the embodiments provide a method by which at least two clients can ensure their transaction is identical and that any portion of the transaction can be identified as suspect and renegotiated or recorded as compromised. Moreover, the embodiments herein provide a program protocol for ensuring a non-repudiated outcome, which identifies compromising outcomes and how to deal with potentially mismatched transcripts. Referring now to the drawings, and more particularly to FIGS. 1 through 10, where similar reference characters denote corresponding features consistently throughout the figures, there are shown preferred embodiments.

FIGS. 1 through 5 illustrate successive steps according to a method of the embodiments herein. Instant messaging will be used as the example message exchange application to help exemplify the flow of events. In FIG. 1, a first system 100 initiates a connection to a second system 200, wherein the connections occur in any one of a network environment, shared memory environment, or in hyper-sockets. In the context of instant messaging, a first user is on the first system 100 and a second user is on the second system 200 in the network 50. The first user identifies the second user as someone he/she wants to talk with (i.e., exchange messages with). The initiation begins when the first user selects (for example double clicks on) the second user's name and the connection is initiated. Next, the first system 100 requests the current time from the second system 200, wherein the time is represented in a standard manner such as Greenwich Mean Time (GMT) or, for example, milliseconds since Jan. 1, 1970, 00:00:00 GMT. Here, the first and second systems 100, 200 are attempting to synchronize their respective clocks. This enables both systems 100, 200 to ensure that messages containing timestamps are verifiable. The systems 100, 200 can accurately detect deviation from this time value and alert or mark the message as being suspect. Then, the second system 200 responds with the time in the appropriate standard format 300. Upon completion of this step, the first system 100 compares the time received from the second system 200 and the time known locally for discrepancies. The standard time format is capable of expressing time zone data in which case each is expressed as Universal Time, which is often referred to as Greenwich Mean Time. In the case of instant messaging, the times can be translated from GMT to the local time to maintain a cohesive user experience. If the times are not the same (i.e., do not match) then the first system 100 triggers a method of time synchronization 400 comprised of the following steps.

The first system 100 requests the second system 200 to verify its time. Then, the second system 200 processes the request to determine whether an official time check is required using the following steps. The second system 200 checks the last refresh variable. The last refresh variable represents the last time the second system 200 synchronized its local clock with another system, often an authoritative timeserver (e.g., time.nist.gov). Timeservers are systems on the network that update their local clocks with the time as broadcast from an atomic clock. Every time the local clock is updated the last refresh variable is updated with the time at which the update took place. This variable is located on the local machine and can be stored in a variety of ways, including memory, files etc. If the time was not checked by the second system 200 within the last n seconds/minutes, the second system 200 forces a check by making a call to a previously identified timeserver. Thereafter, the second system 200 connects to a list of known timeservers to resynchronize time. Time synchronization is well known in the art, and there are known standards for checking time with a timeserver. After this, the second system 200 optionally connects to at least two more remote servers capable of responding to time requests (not shown) to validate the accuracy of the time it received. Finally, the second system 200 responds to the first system 100 with new time value.

The first system 100 then receives the time from the remote server(s) (not shown) and optionally other timeservers it has validated against. The first system 100 then checks to determine if the times returned by the second system 200 fall within a pre-specified threshold. For example, it might be acceptable to communicate from a first server to a second server so long as the clocks on each respective system are within 15 seconds of each other. Next, the first system 100 checks its local time and determines if it should simply set its clock to the value provided by the second system 100. If so, then the first system 100 accepts the time value of the second system 200. In an alternative approach, the first system 100 may connect to at least one timeserver (not shown) and compare against the value specified by a second system 200 to validate the accuracy of the time value. Alternatively, the first system 100 connects to at least one timeserver (not shown) and compares against the value specified by a second system 200 to validate the accuracy of the time value until the first system 100 detects a match in time. Still alternatively, the first system 100 uses one or all of the timeservers used by the second system 200 to validate and synchronize their times. Additionally, the first system 100 or second system 200 can, alternatively, agree to disagree with regard to time via a specified message. Here, either system 100, 200 can initiate such a message; however, the system that first initiates the interaction is responsible for establishing a secure verifiable connection.

Thereafter, the first system 100 and second system 200 exchange public keys 500. In the public key exchange 500, a public key, which is embodied as an alphanumeric value, is provided by some designated authority as an encryption key that, in an asymmetric approach, may be combined with a private key that is derived from the public key. The public key exchange 500 may be run on a public key infrastructure comprising (a) a certificate authority (CA) that issues and verifies a digital certificate, which includes the public key or information regarding the public key; (b) a registration authority (RA), which verifies the CA before a digital certificate is issued to a requester; (c) one or more directories whereupon the certificates including their public keys are held; and a certificate management system. The public key certificate is embodied as a digitally signed document that serves to validate the sender's (first system 100 or second system 200) authorization and name. The document may include a formatted block of data that comprises the name of the certificate holder, which may be a user or a system name, and the holder's public key, as well as the digital signature of a CA for authentication. Then, a user ID packet that includes the sender's (first system 100 or second system 200) unique identifier is sent after the certificate packet. In other embodiments such an exchange might occur or be aided by a third system (not shown).

As shown in FIG. 2, the first system 100 then sends a digitally signed message 600, wherein a message includes at least a message ID, author, recipient, payload, and digital signature of the first system 100. The "Message ID" represents a unique identifier to track a message. This ID can be globally unique or unique to the messaging system. The "Author" represents the creator of the message. This can be a unique ID that can be linked back to an entity; for example, user@xx.ibm.com. The "Recipient" represents the entity to which the message is sent to. This can be a unique ID that can be linked back to an entity; for example, user@xx.ibm.com. The "Payload" represents the contents of the message, the body, which might include text, rich text, images, video, audio, software etc. The "Digital signature" is similar to a human signature on a contract or other document. The major difference is that digital signatures are digital (machine readable) and are not possible to forge. Digital signatures look at all or part of a data set (in this case the message) and generate a signature that allows the recipient of the data set to verify that it has not been tampered and that it originated from the author. Thereafter, the second system 200 receives a first message from the first system 100 and decodes the message 600 using the following steps as further illustrated in FIGS. 3 through 5.

As shown in FIG. 3, the second system 200 verifies the signature of the message 600 (of FIG. 2) and the integrity of the message 720. Techniques for verifying digital signatures are well known in the art. A simplistic explanation of verification includes first recalculating a digest (often a string that represents a unique check sum representing the signed data) and then verifying that the public key of the data creator matches that of the digest creator. Next, the second system 200 responds to the originating system (i.e., first system 100) with a digitally signed acknowledgment message 730, wherein the acknowledgment message 730 includes at least one of the following: a Message ID, which is the same Message ID provided in the digitally signed message 600 of FIG. 2; the signature associated with the ID, which is the same signature provided in the digitally signed message of FIG. 2; and the signature of the second system 200.

As provided in FIG. 4, the second system 200 decodes the first acknowledgment message 730 (of FIG. 3) using the following steps. The first system 100 verifies the signature of the message and verifies the integrity of the message 740; i.e., that the message was not altered during transmission. Then, the first system 100 identifies the message ID and signature in the message and verifies that the signature in the message matches the signature generated for the message ID. If there is no match then an error is returned to the system from where the message was created by the system verifying the signature and further identifying the corruption. If there is a match, the first system 100 responds with an acknowledgment to the second system 200. Next, the first system 100 waits for a response from the second system 200 with a return acknowledgment message to the previous acknowledgment message 750. Upon successful acknowledgment to the acknowledgment 750, the text of the message 600 (of FIG. 2) is committed to an official transcript or record 760 which might include writing the message to a log and updating a user interface by the second system 200, as depicted in FIG. 5. In this context, a transcript 760 is an official record the represents the complete message flow from the first system 100 to the second system 200.

Optionally, at the conclusion of a transaction, wherein one system (for example, system 200) transmits a communication end command, a reconciliation process may take place using the following steps as further illustrated in FIGS. 6 through 8. As indicated in FIG. 6, the first system 100 digitally signs the official transcript 810. Digital signing is well known in the art. Very often a unique hash is created based on both the data set being signed and the private key of the signer. Then, the first system 100 transmits a reconciliation message 820 to the second system 200, wherein the reconciliation message 820 includes at least one of the following: the reconciliation ID, message ID, the transcript, and the digital signature of the first system 100. Next, the second system 200 receives and decodes 830 the reconciliation message using the following steps. The second system 200 verifies the signature of the message and the integrity of the message. Then, the second system 200 identifies the transcript in the payload of the message 820. More specifically, as shown in FIG. 7, the second system 200 processes the transcript 840 using the following steps.

The second system 200 identifies the message ID from the transcript and compares the digital signatures from each line of the transcript with the local version of the transcript as saved by the second system 200. Then, the second system 200 logs each section of the transcript that does not represent identical data to storage (not shown) which can be memory, file, disk, remote storage etc. Thereafter, the second system 200 creates a digitally signed reconciliation response message 850 comprising at least one of the following: the message ID, reconciliation ID, transcript and deltas (if there was a mismatch in the transcript review process). After this, the first system 100 receives the reconciliation response message 850 and decodes the message 860 using the following steps. The first system 100 verifies the signature and integrity of the message and identifies the transcript deltas in the payload of the message. If there are no deltas, then the signed reconciliation response 850 includes both signatures (first system 100 and second system 200).

In the next step of the process, which is illustrated in FIG. 8, the first system 100 detects the presence of transcript deltas and presents the transcript to a user 870 on the first system 100. The user 870 reviews the transcript 880 by either (a) accepting the transcript version of the second system 200, (b) manually correcting the transcript to resolve the conflict, or (c) rejecting the changes leaving the transcript unverifiable. Then, the user 870 in the first system 100 submits the changes via a new reconciliation message 890 to the second system 200 and the process continues until it is aborted or the reconciliation is successful, wherein success is determined by two exact copies signed by all systems (first system 100 and second system 200) involved.

In another embodiment success might be determined by a transcript wherein the deltas are saved on both the first system 100 and second system 200. In this embodiment both systems 100, 200 keep track of all the changes as well as the final document. The deltas are logged as part of the communication locally, so that each system 100, 200 has an identical copy of the final transcript 760 as well as the deltas that may or may not have been reconciled. Another embodiment might reach success at a predetermined agreement level; for example 10% agreement. More specifically, agreement is reached on how much of the differences between the transcript on the first system 100 and the transcript on the second system 200. For example, it might be tolerable to have 1% difference in a chat transcript, but if 50% is different then it must be reconciled or stored as being suspect. Still another embodiment might have this process as automatic based on past behavior or preferences. In this embodiment, the local systems 100, 200 store preferences such as the necessary percent identical transcripts that are required. For example, the first system 100 might have a preference that documents which are 30% accurate are acceptable. This allows the first system 100 to automatically accept all transcripts up to that level of accuracy. Another example might include a preference of how to deal with reconciling differences. Here, the first system 100 might not care to ever reconcile and thus all transcripts would simple be saved with deltas identified. The first system 100 would not prompt the computer operator (i.e., user 870) to engage in an interactive reconciliation. Yet another example might be to store defer preferences which indicate for a given user if one defers to their record. For example, the first system 100 may defer to an assertion of the second system 200 by simply accepting any message where the second system 200 indicates that there is a change and what the correct data should be.

Figure 9:
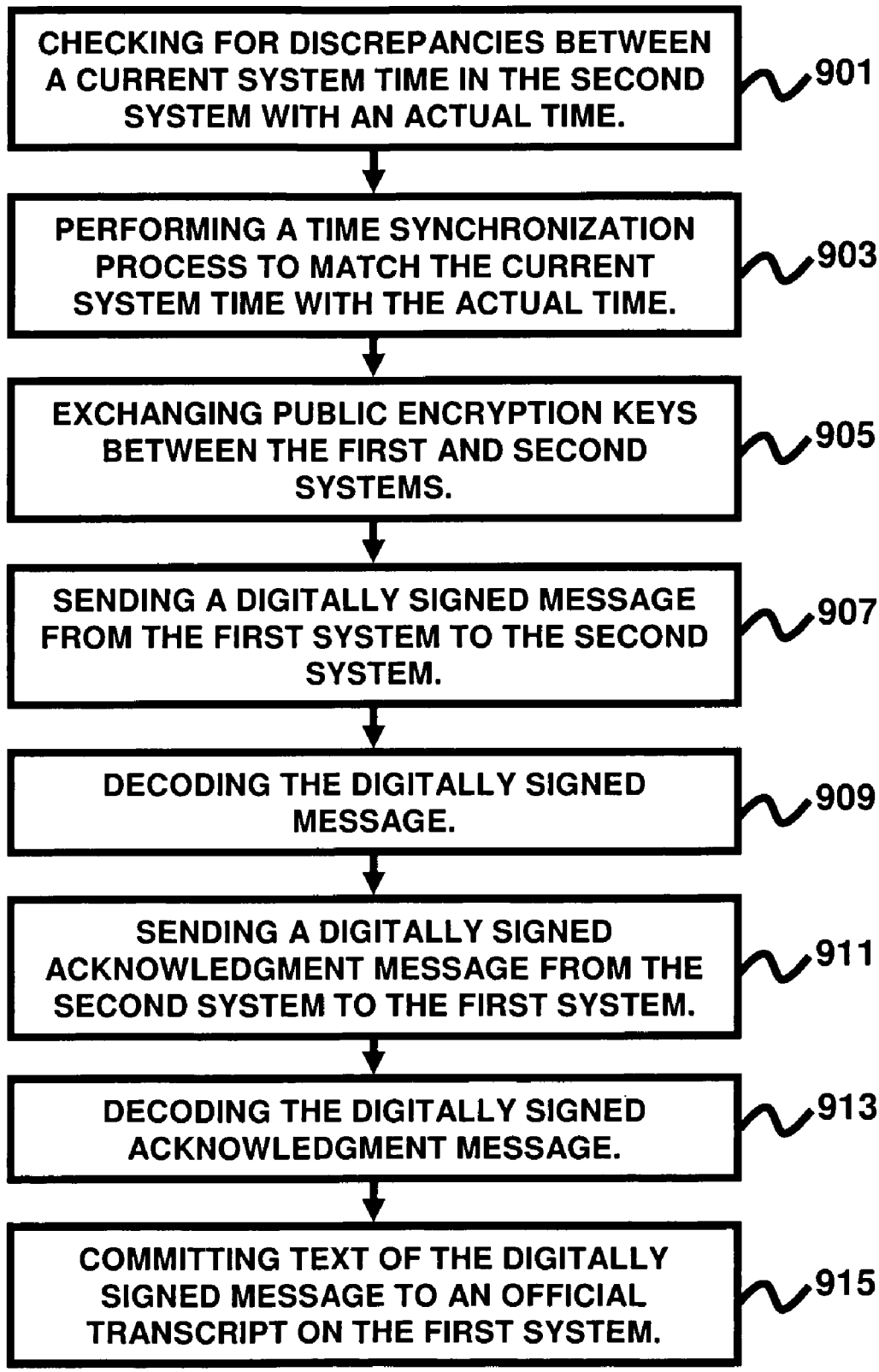
FIG. 9 is a flow diagram illustrating a preferred method according to an embodiment herein.

FIG. 9, with reference to FIGS. 1 through 8, is a flow diagram illustrating a method of performing cooperative non-repudiated message exchange from a first system 100 to a second system 200 in a computer network 50, wherein the method comprises checking (901) for discrepancies between a current system time in the second system 200 with an actual time; performing (903) a time synchronization process 400 to match the current system time with the actual time; exchanging (905) public encryption keys 500 between the first and second systems 100, 200; and sending (907) a digitally signed message 600 from the first system 100 to the second system 200. The next step (909) involves decoding 720 the digitally signed message 600; and sending (911) a digitally signed acknowledgment message 730 from the second system 200 to the first system 100. Thereafter, the next step (913) involves decoding 740 the digitally signed acknowledgment message 730; and committing (915) text of the digitally signed message 600 to an official transcript 760 on the first system 100. Alternatively, the exchanging step (905) may occur prior to the checking step (901).

The method may further comprise transmitting a reconciliation message 820 between the first and second systems 100, 200; decoding 830 the reconciliation message 820, wherein the reconciliation message 820 comprises a payload comprising a transcript; determining 840 an accuracy of the transcript by creating transcript deltas between identified text in the transcript and actual text in the transcript; sending a digitally signed reconciliation response message 850; decoding 860 the digitally signed reconciliation response message 850; reviewing and determining 880 whether to accept the transcript.

The time synchronization process 400 may comprise verifying, by the second system 200, the current system time of the second system 200; determining whether an official time check of the second system 200 is required; connecting to a list of known timeservers to resynchronize the current system time of the second system 200; validating the current system time of the second system 200 with the timeservers; determining whether the current system time matches a pre-specified threshold; and determining whether to accept the current system time as the actual time.

Preferably, the process (909) of decoding 720 of the digitally signed message 600 comprises verifying a digital signature of the digitally signed message 600; and verifying a digital integrity of the digitally signed message 600. Preferably, the process (913) decoding 740 of the digitally signed acknowledgment message 730 comprises verifying a digital signature of the digitally signed acknowledgment message 730; verifying a digital integrity of the digitally signed acknowledgment message 730; identifying a message identifier and a digital signature in the digitally signed acknowledgment message 730; and verifying that the digital signature matches a digital signature generated for the message identifier. Preferably, the decoding 830 of the reconciliation message 820 comprises verifying a digital signature of the reconciliation message 820; and verifying an integrity of the reconciliation message 820.

The embodiments herein can take the form of an entirely hardware embodiment, an entirely software embodiment or an embodiment including both hardware and software elements. A preferred embodiment is implemented in software, which includes but is not limited to firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
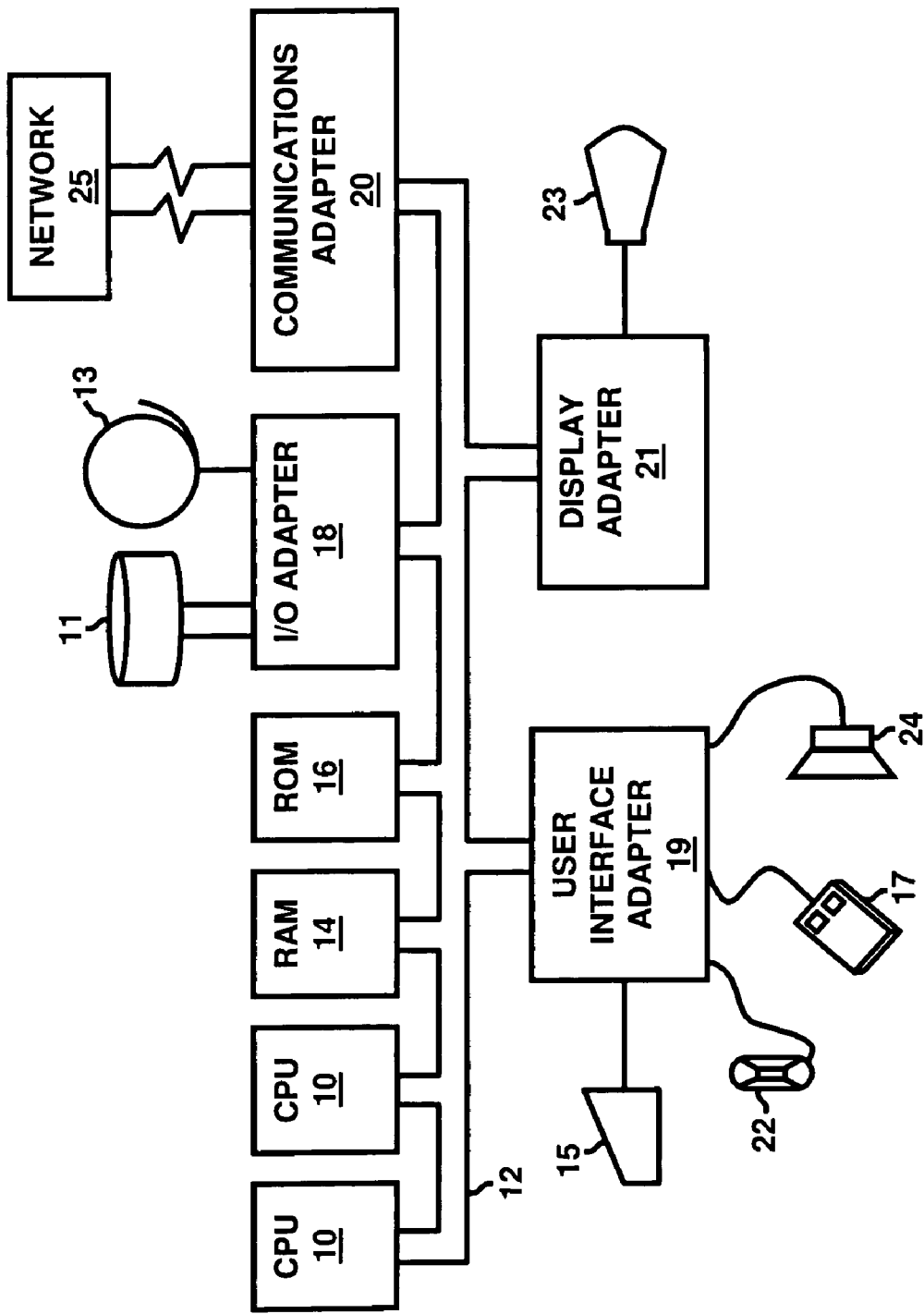
FIG. 10 illustrates a computer system diagram according to an embodiment herein.

A representative hardware environment for practicing the embodiments herein is depicted in FIG. 10. This schematic drawing illustrates a hardware configuration of an information handling/computer system in accordance with the embodiments. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A computer-implemented method of performing cooperative non-repudiated message exchange from a first system to a second system in a computer network, said method comprising:

checking, by a computing device, for discrepancies between a current system time in said second system with an actual time;

performing, by said computing device, a time synchronization process to match said current system time with said actual time;

exchanging, by said computing device, public encryption keys between the first and second systems;

sending, by said computing device, a digitally signed message from said first system to said second system;

decoding, by said computing device, said digitally signed message;

sending, by said computing device, a digitally signed acknowledgment message from said second system to said first system;

decoding, by said computing device, said digitally signed acknowledgment message;
committing, by said computing device, text of said digitally signed message to an official transcript on said first system,
transmitting, by said computing device, a reconciliation message between said first and second systems; and
decoding, by said computing device, said reconciliation message.

2. A computer-implemented method of performing cooperative non-repudiated message exchange from a first system to a second system in a computer network, said method comprising:
checking, by a computing device, for discrepancies between a current system time in said second system with an actual time;
performing, by said computing device, a time synchronization process to match said current system time with said actual time;
exchanging, by said computing device, public encryption keys between the first and second systems;
sending, by said computing device, a digitally signed message from said first system to said second system;
decoding, by said computing device, said digitally signed message;
sending, by said computing device, a digitally signed acknowledgment message from said second system to said first system;
decoding, by said computing device, said digitally signed acknowledgment message; and
committing, by said computing device, text of said digitally signed message to an official transcript on said first system;
transmitting, by said computing device, a reconciliation message between said first and second systems;
decoding, by said computing device, said reconciliation message, wherein said reconciliation message comprises a payload comprising a transcript;
determining, by said computing device, an accuracy of said transcript by creating transcript deltas between identified text in said transcript and actual text in said transcript;
sending, by said computing device, a digitally signed reconciliation response message;
decoding, by said computing device, said digitally signed reconciliation response message;
reviewing, by said computing device, said transcript; and
determining, by said computing device, whether to accept said transcript.

3. The computer-implemented method of claim 1, wherein said time synchronization process comprises:
verifying, by said second system, said current system time of said second system;
determining, by said computing device, whether an official time check of said second system is required;
connecting to a list of known timeservers to resynchronize said current system time of said second system;
validating, by said computing device, said current system time of said second system with said timeservers;
determining, by said computing device, whether said current system time matches a pre-specified threshold; and
determining, by said computing device, whether to accept said current system time as said actual time.

4. The computer-implemented method of claim 1, wherein the decoding of said digitally signed message comprises:
verifying, by said computing device, a digital signature of said digitally signed message; and
verifying, by said computing device, a digital integrity of said digitally signed message.

5. The computer-implemented method of claim 1, wherein the decoding of said digitally signed acknowledgment message comprises:
verifying, by said computing device, a digital signature of said digitally signed acknowledgment message;
verifying, by said computing device, a digital integrity of said digitally signed acknowledgment message;
identifying, by said computing device, a message identifier and a digital signature in said digitally signed acknowledgment message; and
verifying, by said computing device, that said digital signature matches a digital signature generated for said message identifier.

6. The computer-implemented method of claim 2, wherein the decoding of said reconciliation message comprises:
verifying, by said computing device, a digital signature of said reconciliation message; and
verifying, by said computing device, an integrity of said reconciliation message.

7. A computer-implemented method of performing cooperative non-repudiated message exchange from a first system to a second system in a computer network, said method comprising:
sending, by a computing device, a digitally signed message from said first system to said second system;
decoding, by a computing device, said digitally signed message;
sending, by a computing device, a digitally signed acknowledgment message from said second system to said first system, wherein said digitally signed acknowledgment message acknowledges receipt of said digitally signed message and verifies a correctness of said digitally signed message by said second system;
decoding, by a computing device, said digitally signed acknowledgment message;
committing, by a computing device, text of said digitally signed message to an official transcript on said first system,
transmitting a reconciliation message between said first and second systems; and
decoding said reconciliation message.

8. A non-transitory program storage device readable by computer, tangibly embodying a program of instructions executable by said computer to perform a method of performing cooperative non-repudiated message exchange from a first system to a second system in a computer network, said method comprising:
checking for discrepancies between a current system time in said second system with an actual time;
performing a time synchronization process to match said current system time with said actual time;
exchanging public encryption keys between the first and second systems;
sending a digitally signed message from said first system to said second system;
decoding said digitally signed message;
sending a digitally signed acknowledgment message from said second system to said first system;
decoding said digitally signed acknowledgment message;
committing text of said digitally signed message to an official transcript on said first system;
transmitting a reconciliation message between said first and second systems; and
decoding said reconciliation message.

9. The non-transitory program storage device of claim 8, wherein said method further comprises:
  wherein said reconciliation message comprises a payload comprising a transcript;
  determining an accuracy of said transcript by creating transcript deltas between identified text in said transcript and actual text in said transcript;
  sending a digitally signed reconciliation response message;
  decoding said digitally signed reconciliation response message;
  reviewing said transcript; and
  determining whether to accept said transcript.

10. The non-transitory program storage device of claim 8, wherein in said method, said time synchronization process comprises:
  verifying, by said second system, said current system time of said second system;
  determining whether an official time check of said second system is required;
  connecting to a list of known timeservers to resynchronize said current system time of said second system;
  validating said current system time of said second system with said timeservers;
  determining whether said current system time matches a pre-specified threshold; and
  determining whether to accept said current system time as said actual time.

11. The non-transitory program storage device of claim 8, wherein in said method, the decoding of said digitally signed message comprises:
  verifying a digital signature of said digitally signed message; and
  verifying a digital integrity of said digitally signed message.

12. The non-transitory program storage device of claim 8, wherein in said method, the decoding of said digitally signed acknowledgment message comprises:
  verifying a digital signature of said digitally signed acknowledgment message;
  verifying a digital integrity of said digitally signed acknowledgment message;
  identifying a message identifier and a digital signature in said digitally signed acknowledgment message; and
  verifying that said digital signature matches a digital signature generated for said message identifier.

13. The non-transitory program storage device of claim 9, wherein in said method, the decoding of said reconciliation message comprises:
  verifying a digital signature of said reconciliation message; and
  verifying an integrity of said reconciliation message.

14. The computer-implemented method of claim 2, wherein said time synchronization process comprises:
  verifying, by said second system, said current system time of said second system;
  determining, by said computing device, whether an official time check of said second system is required;
  connecting to a list of known timeservers to resynchronize said current system time of said second system;
  validating, by said computing device, said current system time of said second system with said timeservers;
  determining, by said computing device, whether said current system time matches a pre-specified threshold; and
  determining, by said computing device, whether to accept said current system time as said actual time.

15. The computer-implemented method of claim 2, wherein the decoding of said digitally signed message comprises:
  verifying, by said computing device, a digital signature of said digitally signed message; and
  verifying, by said computing device, a digital integrity of said digitally signed message.

16. The computer-implemented method of claim 2, all the limitations of which are incorporated herein by reference, wherein the decoding of said digitally signed acknowledgment message comprises:
  verifying, by said computing device, a digital signature of said digitally signed acknowledgment message;
  verifying, by said computing device, a digital integrity of said digitally signed acknowledgment message;
  identifying, by said computing device, a message identifier and a digital signature in said digitally signed acknowledgment message; and
  verifying, by said computing device, that said digital signature matches a digital signature generated for said message identifier.

17. The computer-implemented method of claim 1, further comprising:
  determining, by said computing device, an accuracy of said transcript by creating transcript deltas between identified text in said transcript and actual text in said transcript.

18. The computer-implemented method of claim 7, further comprising:
  determining, by said computing device, an accuracy of said transcript by creating transcript deltas between identified text in said transcript and actual text in said transcript.

* * * * *